June 3, 1952  J. E. CHRISTIE  2,599,233
WHEEL FOR TANK STRUCTURES
Filed July 13, 1951 2 SHEETS—SHEET 1
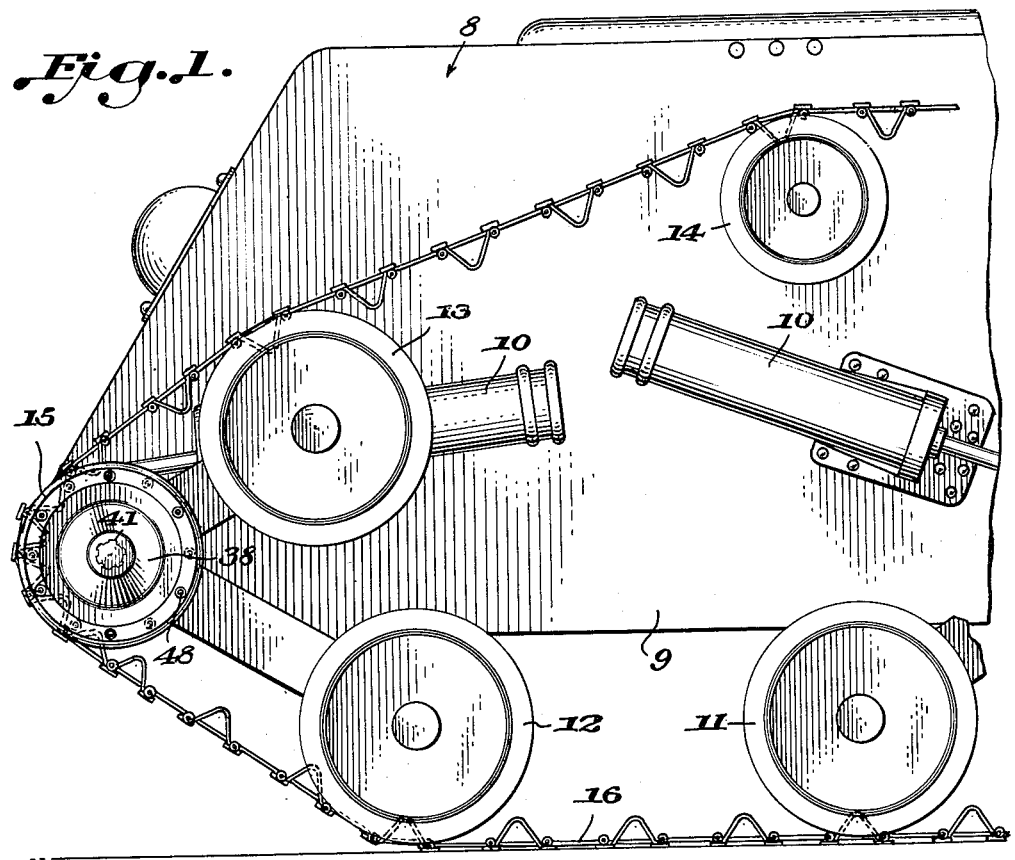
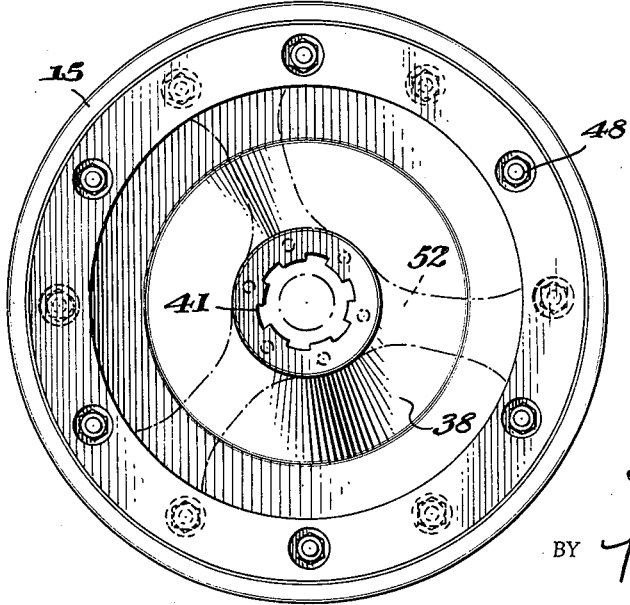
INVENTOR
John E. Christie,
BY Russell R. Patterson
ATTORNEY June 3, 1952   J. E. CHRISTIE   2,599,233
WHEEL FOR TANK STRUCTURES
Filed July 13, 1951   2 SHEETS—SHEET 2

INVENTOR
John E. Christie,
BY Russell E. Patterson
ATTORNEY

Patented June 3, 1952

2,599,233

UNITED STATES PATENT OFFICE 2,599,233

WHEEL FOR TANK STRUCTURES

John Edward Christie, Arlington, Va.

Application July 13, 1951, Serial No. 236,676

4 Claims. (Cl. 305—1)

The present invention relates to new and improved tank or tractor structures, and more particularly, to improvements in the wheels or sprockets for the track of such structures.

An important object of the invention is to provide the power wheel of a tank or similar vehicle with improved roller construction to be engaged by the fin or lug of the track section during travel of said vehicle.

Another object of the invention is to provide a power wheel of the above character constructed so as to eliminate the possibility of dirt packing around the rollers causing damage thereto and also eliminating the danger of track tongues slipping and jamming over rollers usually caused by the rollers being packed with dirt or debris.

A further object of the invention is to provide a power wheel having concaved rollers arranged in spaced relation thereon which is of simple yet sturdy construction and designed so as to overcome difficulties now present in vehicles of this kind.

A further object of the invention is to provide a wheel construction for tank and similar vehicles including a dual rim assembly supporting therebetween a series of concave rollers, each rim of the assembly being formed with a flange portion for confining each end of the rollers thereby preventing the accumulation of dirt, debris and the like on the rollers which would tend to interfere with the normal travel of the track tongue during operation of the vehicle.

A still further object of the invention is to provide a wheel of the above character which is formed with a tapered hub portion against which dirt, debris and the like will be deposited from the track and discharged therefrom on the outside of the wheel.

Other and further objects and advantages of the invention will be apparent to those skilled in the art, from a consideration of the following description of certain specific embodiments of the invention, shown in the accompanying drawings, in which:

Figure 1 is a partial side elevational view of a tank of the type with which the present invention may be used.

Figure 2 is a side elevational view of the new and improved power wheel removed from the tank.

Figure 3:
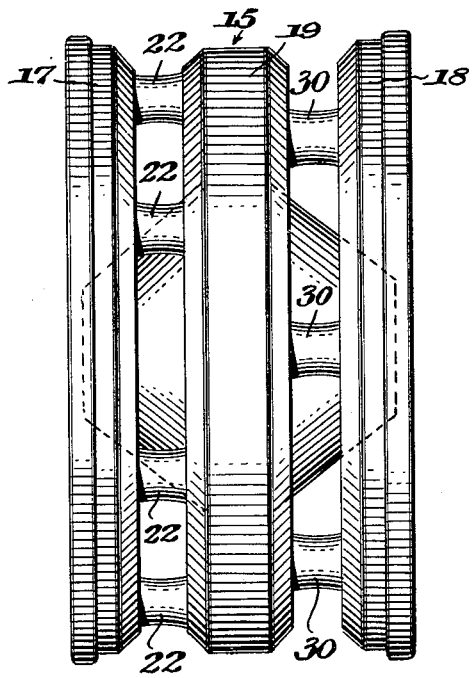
Figure 3 is an end view of one form of power wheel in accordance with the present invention.

Referring to the drawings for a more detailed description thereof, a tank of the type with which the invention is used is generally designated by the reference numeral 8 and comprises an armoured body 9, gun mounts 10, a plurality of guide wheels 11, 12, 13 and 14 and power wheel 15. As is to be understood, the track 16 is trained over the wheels 11, 12, 13 and 14 and is driven by power derived from the wheel 15.

Figure 5:
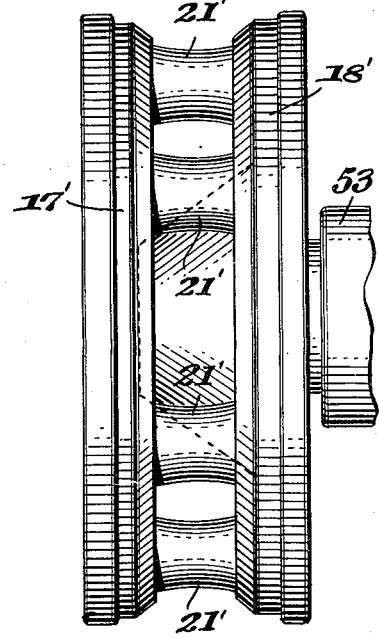
Figure 5 is an end view of a modified form of wheel.

This wheel 15 may be of the type shown in Figure 3 or 5 of the drawings since concave rollers are provided in either form. The Figure 3 form of wheel is used when a double track is to be employed, said track extending in parallel relation and each section thereof being formed with projecting fins for engagement with the rollers, as will be hereinafter more fully described.

Figure 4:
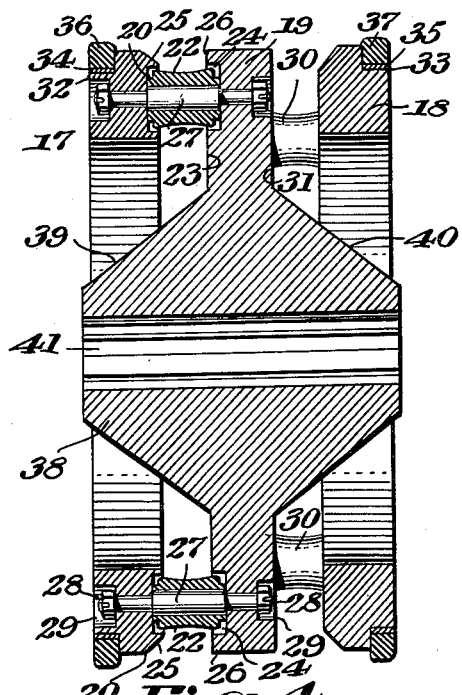
Figure 4 is a sectional view thereof.

In the form of the invention shown in Figures 3 and 4, the wheel 15 is made up of inner and outer sections 17 and 18 and an intermediate section 19. The section 17 is formed with a plurality of equally spaced recesses 20 for receiving one end of the concave rollers 22 and the adjacent face 23 of the section 19 is likewise formed with a plurality of equally spaced recesses 24 for receiving the other end of the rollers 22. As shown in Figure 4 of the drawings the recesses 20 and 24 are formed so as to provide lip portions 25 and 26 respectively, which have a relatively closed fit with each end of the rollers. This means of supporting the rollers will substantially preclude dirt, debris and the like from packing in and around the rollers with the resultant damage to the rollers and the track passing thereover. Each roller is removably held in the recesses by means of pins 27 carrying nuts 28 at each end thereof disposed in countersunk recesses 29 formed in the sections 17 and 19. It is understood that the rollers can be readily replaced by removing the pins and nuts when occasion demands renewal or replacement of the rollers.

The means of confining and supporting the rollers 30 between section 18 and the adjacent face 31 of section 19 is the same as that above described. The rollers 30 are equally spaced the same as rollers 22 but are alternately disposed relative thereto.

The sections 17 and 18 are formed with an annular shoulder portion 32 and 33 on which are pressed rims 34 and 35, said rims carrying tires 36 and 37 respectively. The tires 36 and 37 are proportioned so as to extend beyond the periphery of the sections 17, 18 and 19 and thus prevent ground engagement of said sections during travel of the vehicle. In other words the only point of contact of the wheel 15 with the ground is through the tires 36 and 37.

An added feature of the improved wheel in accordance with the present invention resides in the provision of a tapered hub portion by means of which said wheel will clean itself of mud and foreign substances and move such substances outwardly of the vehicle and free of the track or chain. The intermediate section 19 has its central portion formed with a hub 38, said hub extending through the sections 17 and 18 and presenting tapered surfaces 39 and 40. The hub 38 is centrally bored as indicated at 41, said bore adapted to receive the splined shaft of a motor, not shown, for driving the wheel 15 in the conventional manner.

In the operation of the vehicle, as the wheel 15 is power driven and caused to rotate, the chain or track 16 passes around said wheel. Each full width track section has formed on its upper or inner surface a projecting fin or lug 42. The fins are preferably generally triangular in outline, as shown in Figure 1, and are adapted to engage the rollers 22 and 30 carried by the wheel. Any dirt, mud, foreign surface or the like becoming lodged between the links of the chain will become compressed and subsequently pushed through a passage in the chain and will be deposited on one of the tapered surfaces 39 or 40 for discharge laterally through the respective sections 17 and 18. The foreign substance being discharged away from the wheel will obviate the possibility of it collecting beneath the chain or track causing slippage of the lugs 42 and jamming of the rollers.

Figure 6:
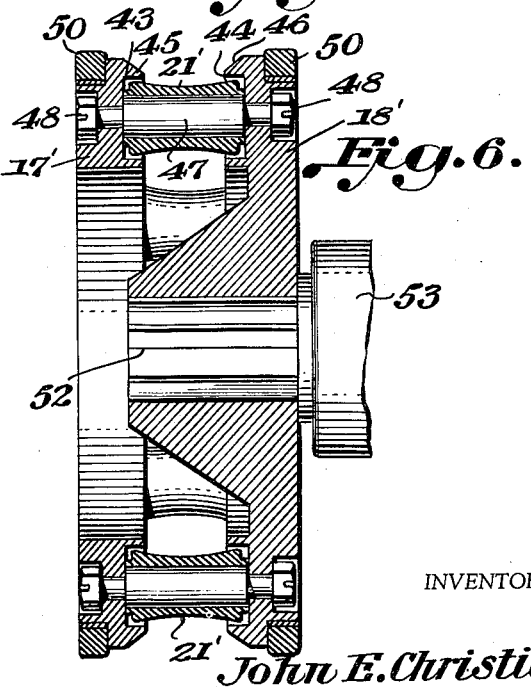
Figure 6 is a sectional view thereof.

In the form of the invention shown in Figures 5 and 6 the wheel 15 is formed of dual sections 17' and 18'. The rollers 22' are supported in the manner previously described, that is by forming opposed recesses 43 and 44 in the adjacent faces of the sections 17' and 18', respectively. The ends of the rollers are protected from dirt packing therearound by means of the lip portions 45 and 46, and said rollers are removably held in position by means of pins 47 and lock nuts 48, said lock nuts being disposed in countersunk recesses 49 in the outer face of each section 17' and 18'. Each section 17' and 18' carries a tire and rim 50 press fitted thereon and supported on annular flanges formed on each section in the manner previously described.

The section 18' is formed with a hub 50 tapering inwardly toward the section 17'. This hub 50 extends inwardly a sufficient distance so as to be disposed directly beneath the entire length of the rollers 21' and the entire width of the rollers passing thereover. In this manner all dirt, debris and foreign substances dropping from the chain or track will be deposited on the tapered surface 51 for discharge outwardly of the wheel.

The hub 50 is bored internally for receiving a splined shaft 52 of the motor 53 for driving the wheel in this conventional manner.

If desired, the outside rim of the combined wheel can be formed with spokes 54 as shown in broken lines in Figure 2 of the drawings. Such a construction may sometimes be desirable for adding rigidity and strength to the wheel.

I claim:

1. A wheel adapted for use with an endless track adapted to pass around the wheel and provided with driving fins, said wheel comprising a plurality of annular sections, each section formed with a series of oppositely disposed spaced recesses, rollers supported between said sections and having each end thereof confined within said recesses, means for removably attaching said rollers to said sections and one of said sections carrying means enabling said wheel to be power driven whereby the fins of said endless track are brought into engagement with said rollers.

2. A wheel adapted for use with an endless track adapted to pass around the wheel and provided with driving fins, said wheel comprising a plurality of annular sections, each section formed with a series of oppositely disposed spaced recesses, rollers supported between said sections and having each end thereof confined within said recesses, said recesses being formed so as to provide an overhanging lip portion for protecting each end of the rollers from dirt packing therearound as the endless track passes around the wheel, means for removably attaching said rollers to said sections, and one of said sections carrying means enabling said wheel to be power driven whereby the fins of said endless track are brought into engagement with said rollers.

3. A wheel for use with an endless track adapted to pass around the wheel and provided with driving fins, said wheel formed of a pair of annular sections, each section provided with a series of oppositely disposed recesses, rollers supported between said sections and having each end thereof confined within said recess, means for removably attaching said rollers to said sections, a tapered hub on one of said sections and extending inwardly toward the other of said sections so as to be disposed beneath said rollers, and means engaging said hub enabling said wheel to be power driven, whereby the fins of said endless track are brought into engagement with said rollers.

4. A wheel for use with an endless track adapted to pass around the wheel and provided with driving fins, said wheel comprising a central annular section and inner and outer annular sections, a series of rollers supported between said central and outer sections, a second series of rollers supported between said central and inner sections, said central section formed with a hub tapering toward said inner and outer sections, the tapered portion of the hub being disposed beneath each series of rollers, and means enabling said wheel to be power driven whereby the fins of said endless track are brought into engagement with said rollers.

JOHN EDWARD CHRISTIE.

No references cited.